(12) United States Patent
Lin et al.

(10) Patent No.: US 11,127,160 B2
(45) Date of Patent: Sep. 21, 2021

(54) OBJECT CHARACTERISTIC LOCATING DEVICE AND LASER AND IMAGING INTEGRATION SYSTEM

(71) Applicant: NATIONAL CHIAO TUNG UNIVERSITY, Hsinchu (TW)

(72) Inventors: Chun-Yu Lin, Taichung (TW); Feng-Chun Hsu, Kaohsiung (TW); Sumesh Nair, Tainan (TW); Jing-Jie Su, Tainan (TW); Chia-Ying Chang, New Taipei (TW); Shean-Jen Chen, Tainan (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 58 days.

(21) Appl. No.: 16/795,545

(22) Filed: Feb. 19, 2020

(65) Prior Publication Data
US 2021/0118171 A1    Apr. 22, 2021

(30) Foreign Application Priority Data

Oct. 17, 2019   (TW) .................... 108137552

(51) Int. Cl.
| | | |
|---|---|---|
| *G06T 7/73* | (2017.01) | |
| *G01S 17/06* | (2006.01) | |
| *G06K 9/00* | (2006.01) | |

(52) U.S. Cl.
CPC ............. *G06T 7/74* (2017.01); *G01S 17/06* (2013.01); *G06K 9/00624* (2013.01); *G06T 2207/10004* (2013.01)

(58) Field of Classification Search
CPC . G01S 17/06; G06T 2207/10004; G06T 7/74; G06K 9/00624
See application file for complete search history.

(56) References Cited

U.S. PATENT DOCUMENTS

| | | | | |
|---|---|---|---|---|
| 9,874,635 | B1* | 1/2018 | Eichenholz | ........... G01S 7/4814 |
| 2004/0042648 | A1* | 3/2004 | Yoshidda | .................. G06T 7/74 |
| | | | | 382/151 |

(Continued)

FOREIGN PATENT DOCUMENTS

| | | |
|---|---|---|
| TW | 201118794 A1 | 6/2011 |
| TW | 201700322 A | 1/2017 |
| TW | 201907136 A | 2/2019 |

OTHER PUBLICATIONS

Li, Haijun, et al. "An electrostatic MEMS translational scanner with large out-of-plane stroke for remote axial-scanning in multi-photon microscopy." Micromachines 8.5 (2017): 159. (Year: 2017).*

(Continued)

*Primary Examiner* — Pinalben Patel
(74) *Attorney, Agent, or Firm* — CKC & Partners Co., LLC

(57) ABSTRACT

An object characteristic locating device is provided, which includes a camera module and a processing module. The camera module is configured to capture an image from a front scene. The processing module is configured to perform the following operations: locating a position of an image object in the captured image, and determining a framing range with the image object from the captured image; and preforming image processing on the framing range according to a characteristic of the image object, so as to locate the position of an image characteristic portion of the image object in the captured image.

6 Claims, 11 Drawing Sheets

(56) References Cited

U.S. PATENT DOCUMENTS

| | | | | |
|---|---|---|---|---|
| 2006/0071846 A1* | 4/2006 | Yanagisawa | .......... | G01S 7/4818 |
| | | | | 342/54 |
| 2012/0002067 A1* | 1/2012 | Fukata | ............... | H04N 5/23219 |
| | | | | 348/222.1 |
| 2013/0202161 A1* | 8/2013 | Shor | .................. | G06K 9/00241 |
| | | | | 382/118 |
| 2015/0016714 A1* | 1/2015 | Chui | .................. | G06K 9/00684 |
| | | | | 382/154 |
| 2018/0330526 A1* | 11/2018 | Corcoran | ........... | H04N 5/23293 |

OTHER PUBLICATIONS

Joseph Redmon et al., "You Only Look Once: Unified, Real-Time Object Detection", 2016 IEEE Conference on Computer Vision and Pattern Recognition (CVPR), Las Vegas, NV, USA, Jun. 2016.

* cited by examiner

OBJECT CHARACTERISTIC LOCATING DEVICE AND LASER AND IMAGING INTEGRATION SYSTEM

RELATED APPLICATIONS

This application claims priority to Taiwanese Application Serial Number 108137552, filed on Oct. 17, 2019, which is herein incorporated by reference.

BACKGROUND

Field of the Invention

The invention relates to object recognition, and more particularly to an object characteristic locating device and a laser and imaging integration system.

Description of Related Art

The laser and imaging integration system is a system in which a camera module and a laser source module are integrated. For the operation of such system, the camera module recognizes a target object and calculates the position of the target object, and then the laser module emits a laser beam to the target object. However, if the laser beam is desired to be aimed at a particular portion of the target object, further image processing is required to be performed on the captured image.

SUMMARY

One aspect of the invention relates to an object characteristic locating device which includes a camera module and a processing module. The camera module is configured to capture an image from a front scene. The processing module is configured to perform the following operations: locating a position of an image object in the captured image, and determining a framing range with the image object from the captured image; and preforming image processing on the framing range according to a characteristic of the image object, so as to locate a position of an image characteristic portion of the image object in the captured image.

In accordance with one embodiment of the invention, the processing module is further configured to perform the following operations: recognizing a type of the image object from the captured image; and determining an image processing mechanism on the framing range depending on the type of the image object.

In accordance with one further embodiment of the invention, the processing module is configured to determine the framing range according to a training model, and is configured to determine the type of the image object from a correlation between the training model and the framing range.

In accordance with one further embodiment of the invention, the operation of performing image processing on the framing range by the processing module includes performing chromaticity space conversion on the framing range.

In accordance with one further embodiment of the invention, the operation of performing image processing on the framing range by the processing module includes: determining a corresponding area of the image characteristic portion in the framing range depending on a chromaticity space threshold; and calculating a center point of the corresponding area to be regarded as the position of an image characteristic portion in the captured image.

Another aspect of the invention relates to a laser and imaging integration system which includes the abovementioned object characteristic locating device and a laser module. The object characteristic locating device which includes a camera module and a processing module. The camera module is configured to capture an image from a front scene. The processing module is configured to perform the following operations: locating a position of an image object in the captured image, and determining a framing range with the image object from the captured image; and preforming image processing on the framing range according to a characteristic of the image object, so as to locate a position of an image characteristic portion of the image object in the captured image. The laser module is configured to emit a laser beam toward a characteristic portion of an object in the front scene corresponding to the image characteristic portion according to the position of the image characteristic portion in the captured image located by the object characteristic locating device.

In accordance with one embodiment of the invention, the laser module includes a laser source and a dichroic mirror. The laser source is configured to emit the laser beam. The dichroic mirror is configured to reflect the laser beam and allow incident light corresponding to the captured image to pass therethrough.

In accordance with one further embodiment of the invention, the laser module further includes a biaxial galvanometer, a biaxial galvanometer configured to adjust an angle thereof according to a voltage signal, so as to change a traveling direction of the laser beam.

In accordance with one further embodiment of the invention, the laser and imaging integration system further includes a control module which is coupled to the processing module and the laser module. The processing module is configured to transmit the voltage signal to the control module, such that the control module controls the angle of the biaxial galvanometer accordingly.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

The detailed explanation of the invention is described as following. The described preferred embodiments are presented for purposes of illustrations and description, and they are not intended to limit the scope of the invention.

Terms used herein are only used to describe the specific embodiments, which are not used to limit the claims appended herewith. Unless limited otherwise, the term "a," "an," "one" or "the" of the single form may also represent the plural form.

Spatially relative terms, such as "over," "on," "under," "below," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Regarding the term "coupled" used in the following description, it may be used to indicate that two or more elements are in direct physical or electrical contact with each other, or may also mean that two or more elements may not be in direct contact with each other. "Coupled" may still be used to indicate that two or more elements cooperate or interact with each other.

Figure 1:
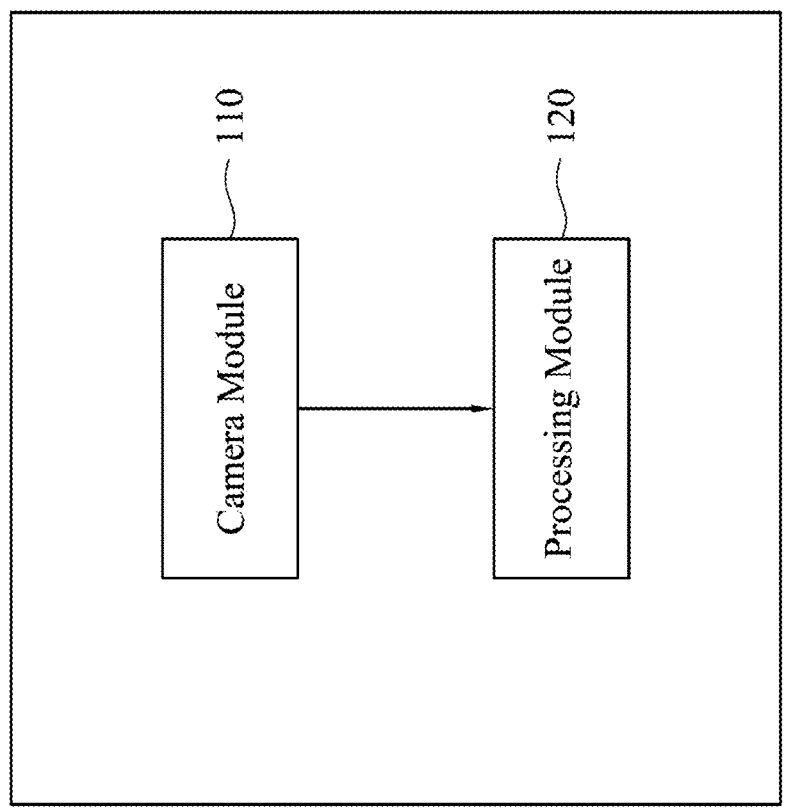
FIG. 1 is a schematic diagram of an object characteristic locating device in accordance with some embodiments of the invention.

FIG. 1 is a schematic diagram of an object characteristic locating device 100 in accordance with some embodiments of the invention. The object characteristic locating device 100 includes a camera module 110 and a processing module 120. The camera module 110 is configured to capture an image from a front scene. The camera module 110 may include an optical sensor chip, such as a charge coupled device (CCD) chip, a complementary metal oxide semiconductor (CMOS) chip or another chip suitable for detecting incident light. In addition, the camera module 110 may further includes a lens for refracting incident light from the front scene, such that the optical sensor chip detects and converts the incident light into a captured image. The processing module 120 is used to perform image processing on the captured image, so as to locate an image object and a position of an image characteristic portion of the image object in the captured image.

Figure 2:
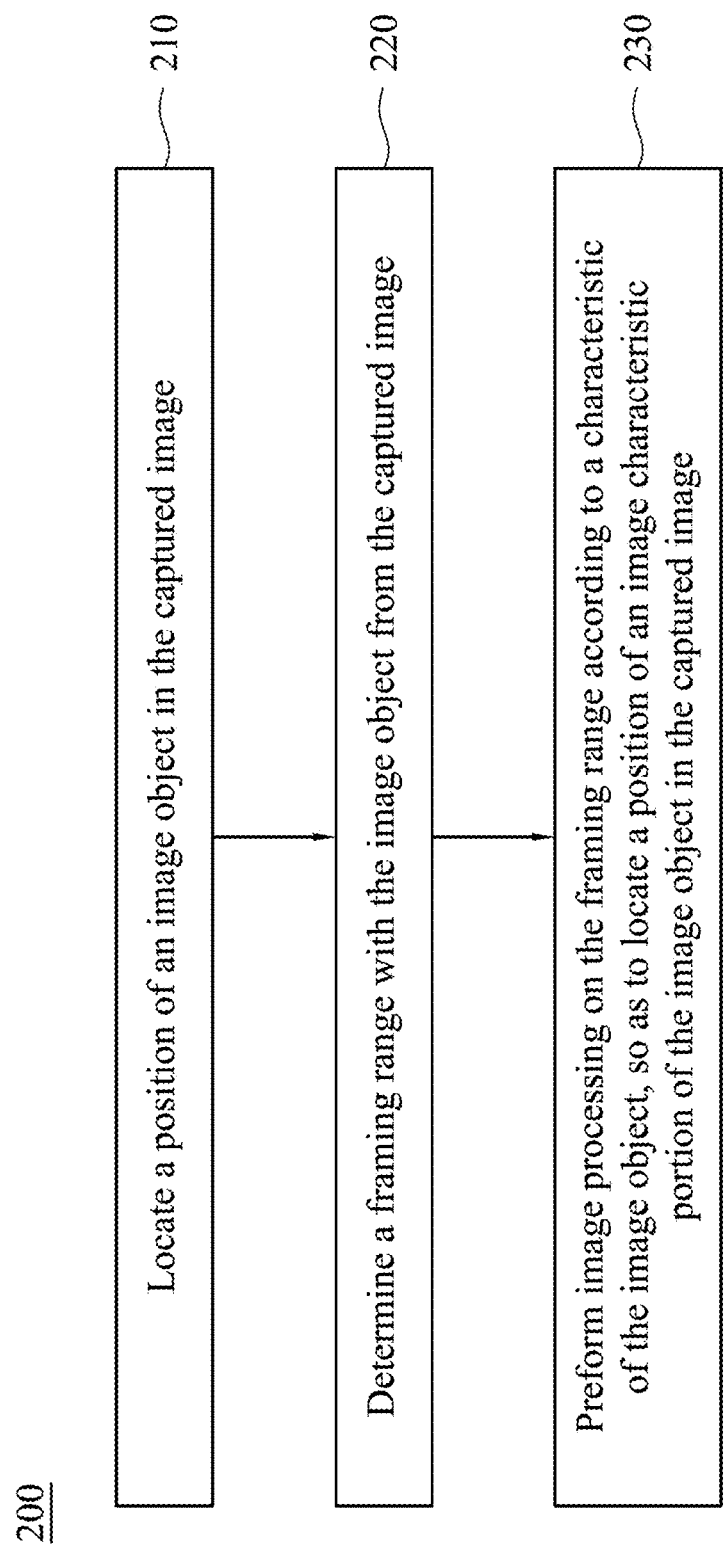
FIG. 2 is a flowchart of an object characteristic locating operation in accordance with some embodiments of the invention.

Specifically, referring to FIG. 2, which is a flowchart of an object characteristic locating operation 200 performed by the processing module 120. The object characteristic locating operation 200 is described in the following. First, Step 210 is performed to determine whether any image object exists in the captured image. In a condition in which an image object exists in the captured image, the position of the image object in the captured image is located, and a framing range with the image object from the captured image is determined.

The step of determining whether any image object exists in the captured image may be performed by comparing the captured image with a training model. The image object may correspond to a particular object, and the training model may be obtained by offline training, e.g., established by pre-collecting adequate training images (including the same image object) and then performing iterative operations on the obtained training images. In addition, the training model may be plural in number, and may correspond to various types of image objects. The training models may be established independently.

In some embodiments, the processing module 120 may determine whether plural image objects exist in the captured image. In a condition in which plural image objects exist in the captured image, Step 220 is then performed, in which the positions of these image objects in the captured image are located, and framing ranges respectively with the image objects from the captured image are determined.

Furthermore, the processing module 120 may recognize which type the image object belongs to from the captured image. In a condition in which an image object exists in the captured image, the correlation between the training model and the framing range with the image object is calculated, and the correlation may be compared with a threshold value, so as to further determine the possibility that the type of the image object is the same as the object type corresponding to the training model.

In some embodiments, in a condition in which plural image objects exist in the captured image, the correlations between the training models and the framing ranges respectively with the image objects are calculated, and these correlations may be compared with a threshold value, so as to further individually determine the possibilities that the types of the image objects are respectively the same as one or more object types corresponding to the training models.

Figure 3:
FIG. 3 is an example of a captured image corresponding to a front scene and captured by the camera module in FIG. 1.

In the following, caterpillar recognition is exemplified for description. FIG. 3 is an example of a captured image corresponding to a front scene and captured by the camera module 110. As shown in FIG. 3, two caterpillar image objects are in the captured image; one of which is at about the center of the captured image, while the other is at about the upper right side of the captured image. If Step 210 of the object characteristic locating operation 200 is performed on the captured image shown in FIG. 3, the processing module 120 may determine that two caterpillar image objects are respectively at about the center and the upper right side of the captured image according to the training model. Afterwards, the positions of the caterpillar image objects in the captured image are respectively located, and the framing ranges respectively with the caterpillar image objects in the captured image are determined. The processing module 120 further calculates the correlation between the training model and the framing range with the image object, and then compares the correlation with a threshold value, so as to further determine the possibility that the type of the image object is the same as the object type corresponding to the training model.

Figure 4:
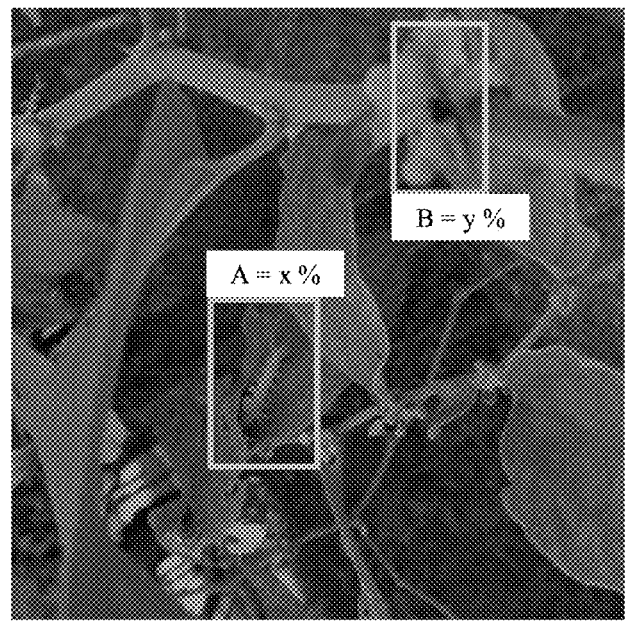
FIG. 4 shows the framing ranges of the caterpillar image objects.

As shown in FIG. 4, the framing ranges of the caterpillar image objects are outlined; two caterpillar image objects are in the captured image; one of which is at about the center of the captured image object, while the other is at about the upper right side of the captured image. If the possibility x % that the caterpillar image object correspond to type-A caterpillar is the largest, then "A=x %" may be labeled around the outlined frame of the caterpillar image object; if the possibility y % that the caterpillar image object correspond to type-B caterpillar is the largest, then "B=y %" may be labeled around the outlined frame of the caterpillar image object.

Referring back to FIG. 2. After Step 220 is accomplished, Step 230 is then performed, in which image processing is performed on the captured range according to the image characteristic of the image object, so as to locate the position of an image characteristic portion of the image object in the captured image. For example, if the image object is a human image object, the processing module 120 may locate the position of the head image in the captured image from the human image object according to characteristics of an organ and/or a tissue of a human head shown in the captured image.

Figure 5:
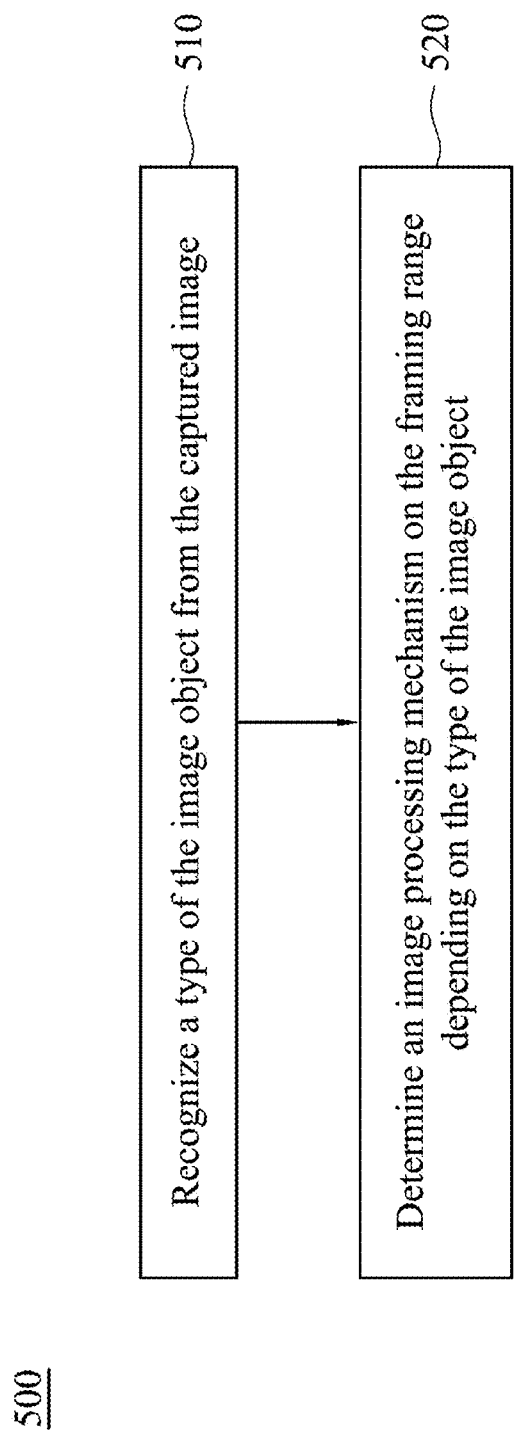
FIG. 5 is a flowchart of an image processing pre-operation on the captured range by the processing module in FIG. 1.

The processing module 120 may perform a variety of image processing functions depending on the type of the image object. FIG. 5 is a flowchart of an image processing pre-operation 500 on the captured range performed by the processing module 120. Firstly, Step 510 is performed, in which the type of the image object is recognized from the captured image. Step 510 may be similar to that in which a training model is used to determine the possibility that the type of the image object is the same as the object type corresponding to the training model. If the type of the image object has been already recognized, Step 510 may be omitted for directly entering the next step. Afterwards, Step 520 is performed, in which an image processing mechanism on the framing range is determined depending on the type of the image object. The image processing mechanism on the framing range may include color space conversion, threshold value comparison and/or noise cancellation. After the image processing pre-operation 500 is accomplished, image processing is performed on the captured range accordingly, so as to locate the position of an image characteristic portion of the image object in the captured image.

Figure 6A:
FIGS. 6A-6D show an example of image characteristic portion positioning.
Figure 6B:
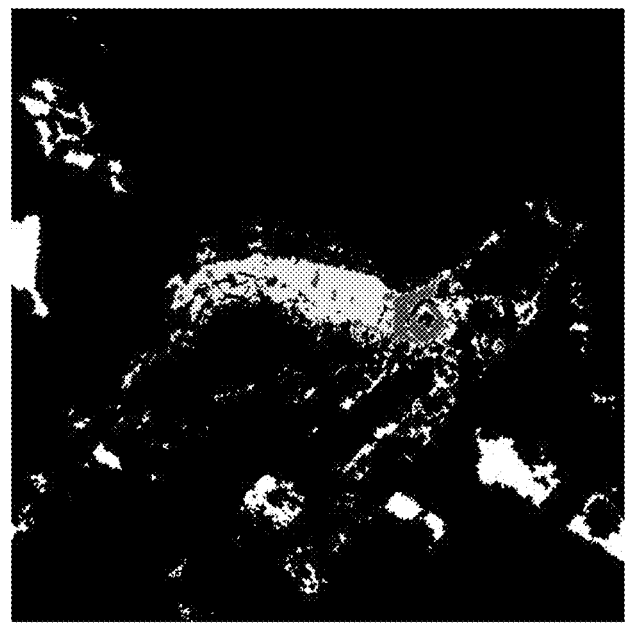
Figure 6C:
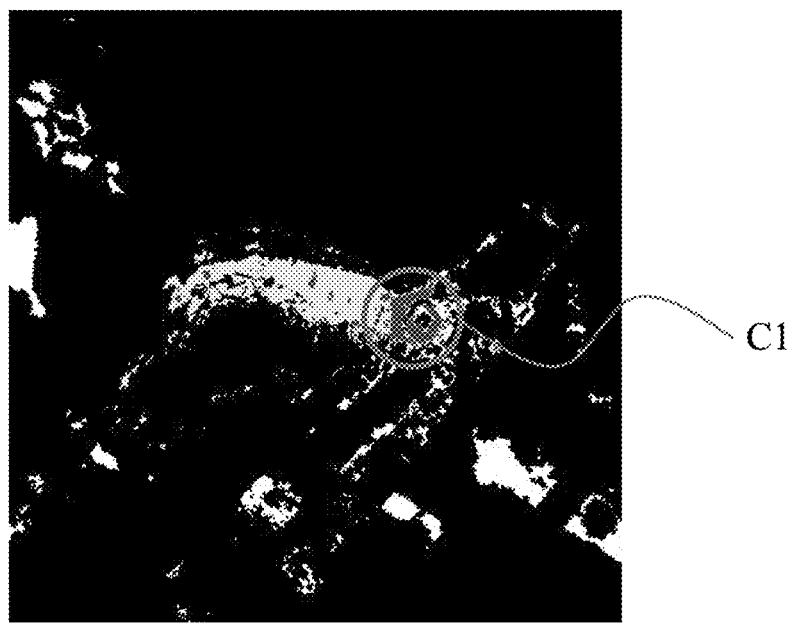
Figure 6D:
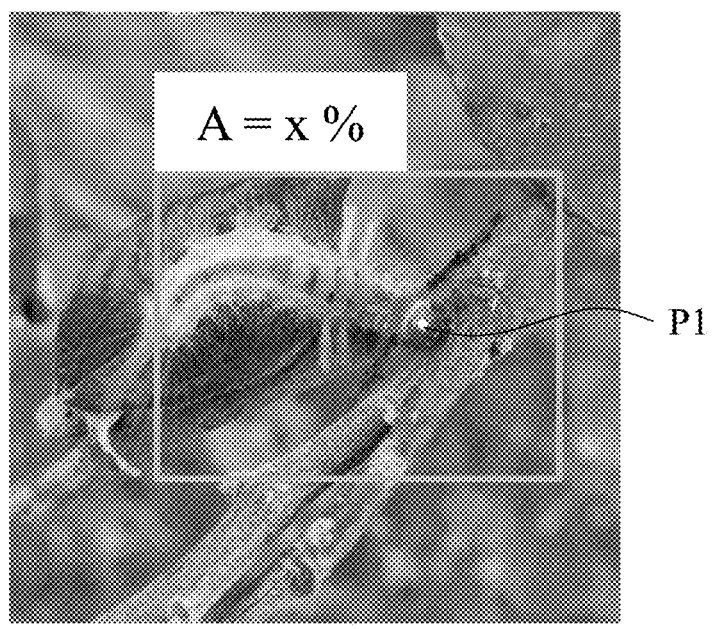

FIGS. 6A-6D show an example of image characteristic portion positioning. In FIG. 6A, an image corresponding to the type-A caterpillar in a framing range is shown. After determining that the image corresponds to the type-A caterpillar, the processing module 120 performs color space conversion on the image in the framing range from the RGB color space to the HSV color space, and performs processing on the converted image by a threshold of each coordinate (i.e. hue, saturation and lightness coordinates) in the HSV color space according to the image characteristic of the type-A caterpillar. The conversion result is as shown in FIG. 6B. Because the color of the head appearance of the type-A caterpillar is closer to red than those of the appearances of the other portions, the largest red area (as shown in the circle C1 in FIG. 6C) in the converted image is found first, and then the center point of the red area is calculated. In the end, the calculated center point (the characteristic portion positioning point P1 shown in FIG. 6D) is mapped into the captured image, so as to finish locating the head of the type-A caterpillar.

Figure 7A:
FIGS. 7A-7D show another example of image characteristic portion positioning.
Figure 7B:
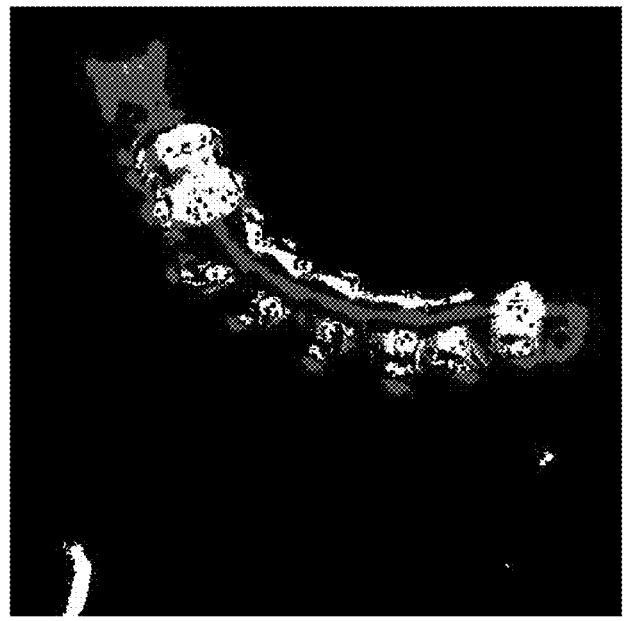
Figure 7C:
Figure 7D:
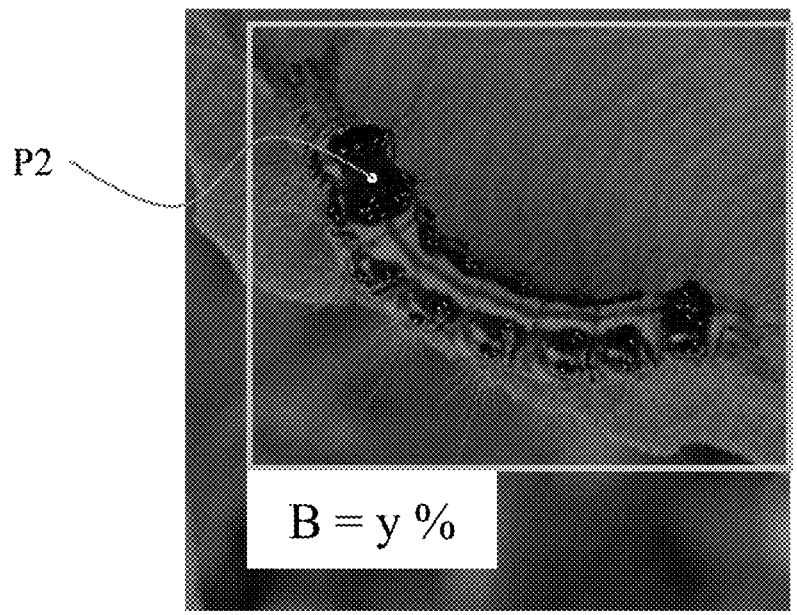

FIGS. 7A-7D show another example of image characteristic portion positioning. In FIG. 7A, an image corresponding to the type-B caterpillar in a framing range is shown. After determining that the image corresponds to the type-B caterpillar, the processing module 120 performs processing on the converted image by a threshold of each coordinate (i.e. red, green and blue coordinates) in the RGB color space according to the image characteristic of the type-B caterpillar. The conversion result is as shown in FIG. 7B. Because the head appearance of the type-B caterpillar has a largest black area (white after conversion process) than the other portions of the type-B caterpillar, the largest white area (as shown in the circle C2 in FIG. 7C) in the converted image is found first, and then the center point of the white area is calculated. In the end, the calculated center point (the characteristic portion positioning point P2 shown in FIG. 7D) is mapped into the captured image, so as to finish locating the head of the type-B caterpillar.

It is noted that the step of finding the largest red area or the largest white area may be performed by applying erosion, dilation, opening and/or closing of the morphological operations, and calculating the center point of the red area or the white area may be implemented by a k-means cluster algorithm, but embodiments of the invention are not limited thereto.

Figure 8:
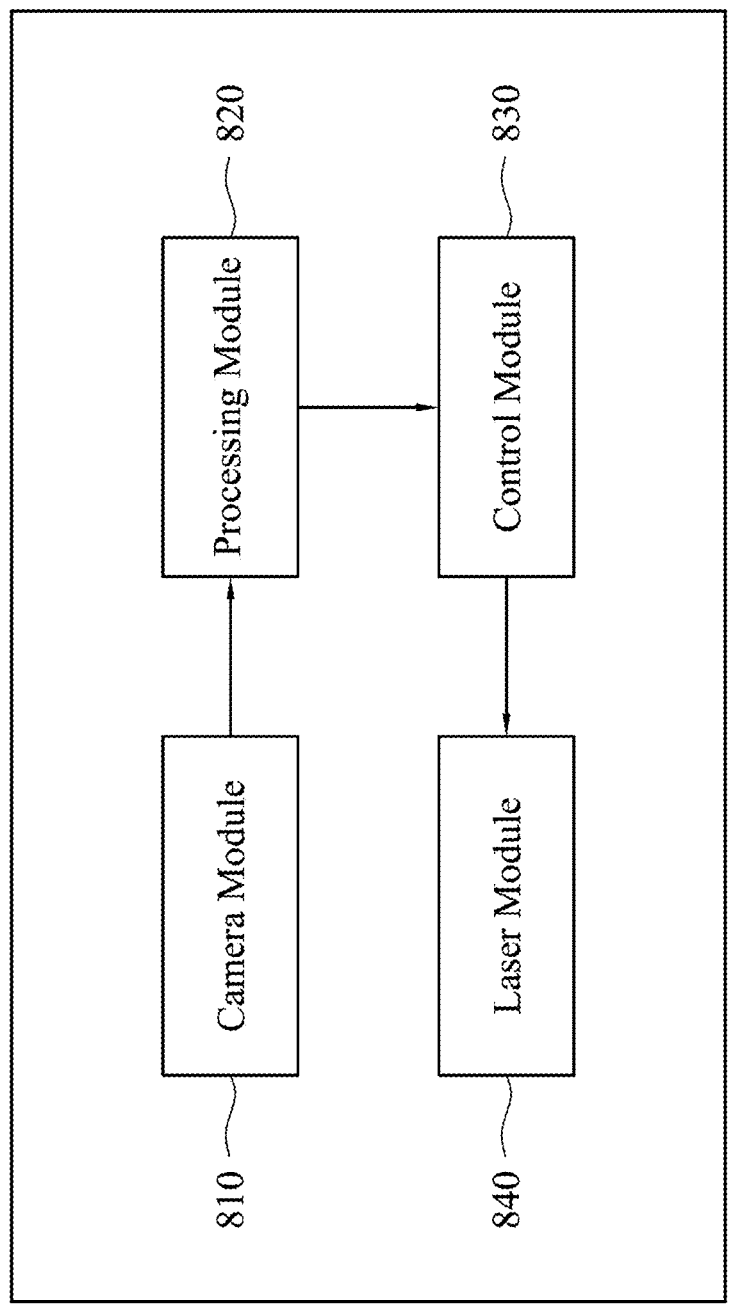
FIG. 8 is a schematic diagram of a laser and imaging integration system in accordance with some embodiments of the invention.

FIG. 8 is a schematic diagram of a laser and imaging integration system 800 in accordance with some embodiments of the invention. As shown in FIG. 8, the laser and imaging integration system 800 includes a camera module 810, a processing module 820, a control module 830 and a laser module 840. The camera module 810 and the processing module 820 may be the camera module 110 and the processing module 120 of the object characteristic locating device 100. In other words, the camera module 810 and the processing module 820 may be utilized to perform the aforementioned object characteristic locating. After locating the object characteristic, the control module 830 controls the laser module 840 to emit a laser beam toward a particular position in the front scene according to the signal provided by the processing module 820.

Figure 9:
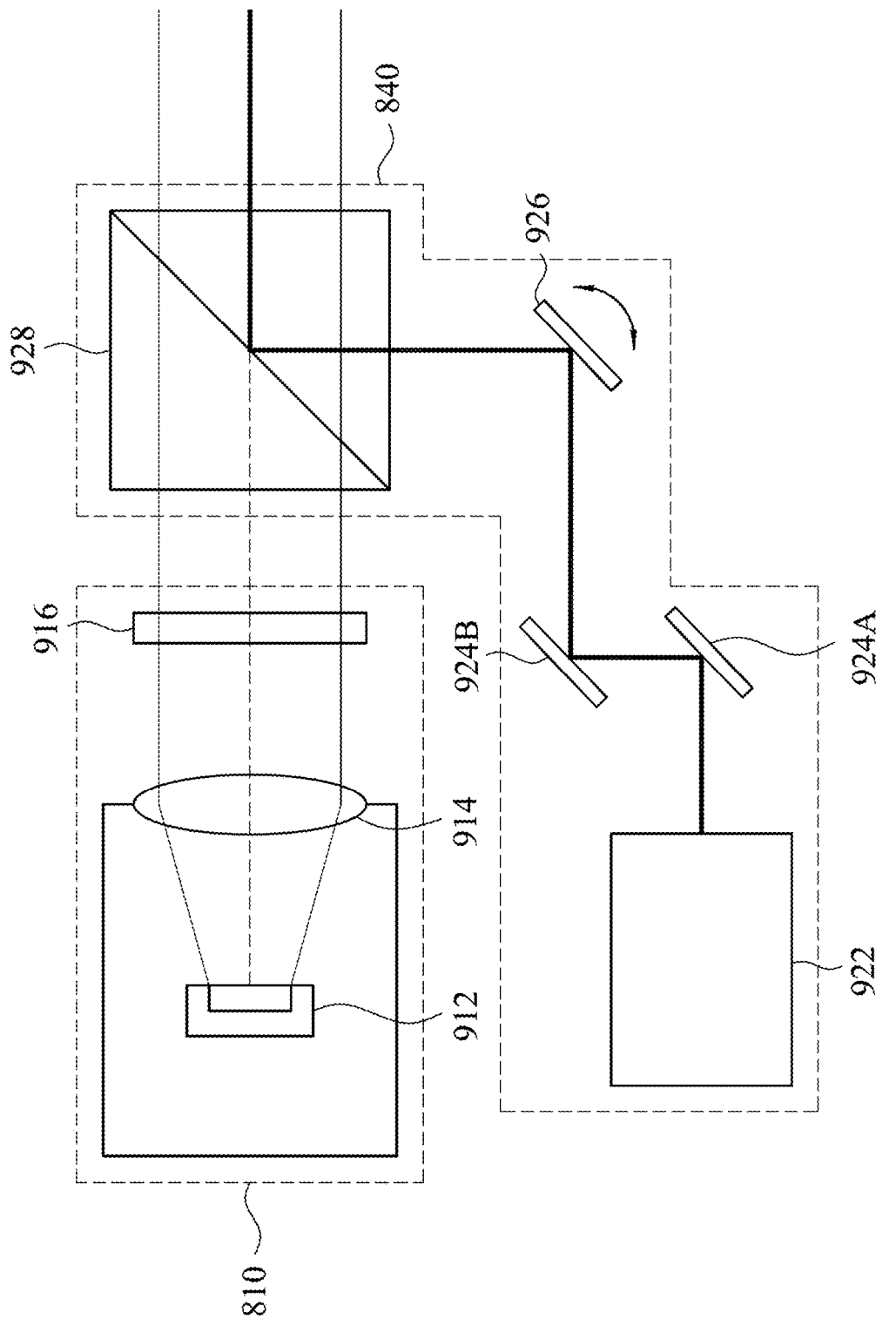
FIG. 9 is a detailed schematic diagram of the camera module and the laser module in FIG. 8.

FIG. 9 is a detailed schematic diagram of the camera module 810 and the laser module 840 in FIG. 8. As shown in FIG. 9, the camera module 810 includes an image sensor 912 and a lens 914, and the laser module 840 includes a laser source 922, reflective mirrors 924A and 924B, a biaxial galvanometer 926 and a dichroic mirror 928. The image sensor 912 includes an optical sensor chip, such as a charge coupled device (CCD) chip, a complementary metal oxide semiconductor (CMOS) chip, or another chip suitable for detecting incident light. The lens 914 is used to refractive incident light, such that the image sensor 912 detects and converts the incident light into image data. In some embodiments, the camera module 810 further includes an optical filter 916 for blocking invisible light components, so as to improve the contrast ratio of the captured image. The laser source 922 may include a laser diode as a pumping light source for stimulating a laser crystal to generate a laser beam with a particular wavelength band (e.g. a near-ultraviolet wavelength band or a near-infrared wavelength band). The reflective mirrors 924A and 924B are utilized to change the traveling direction of the laser beam emitted by the laser source 922, and the biaxial galvanometer 926 is utilized to quickly change the collimated direction of the laser beam reflected by the dichroic mirror 928 in the X and Y directions. The biaxial galvanometer 926 is disposed in the optical path of the laser beam, and is configured to adjust its position according to the received voltage signal, so as to change the traveling direction of the laser beam. The dichroic mirror 928 has a high transmittance for visible light, such that the external visible light can penetrate through the dichroic mirror 928 and into the camera module 810 to be absorbed by the image sensor 912. On the other hand, the dichroic mirror 928 has a high reflectance for the laser beam generated by the laser source 922, such that most of the light beam generated by the laser source 922 is reflected by the dichroic mirror 928.

Figure 10:
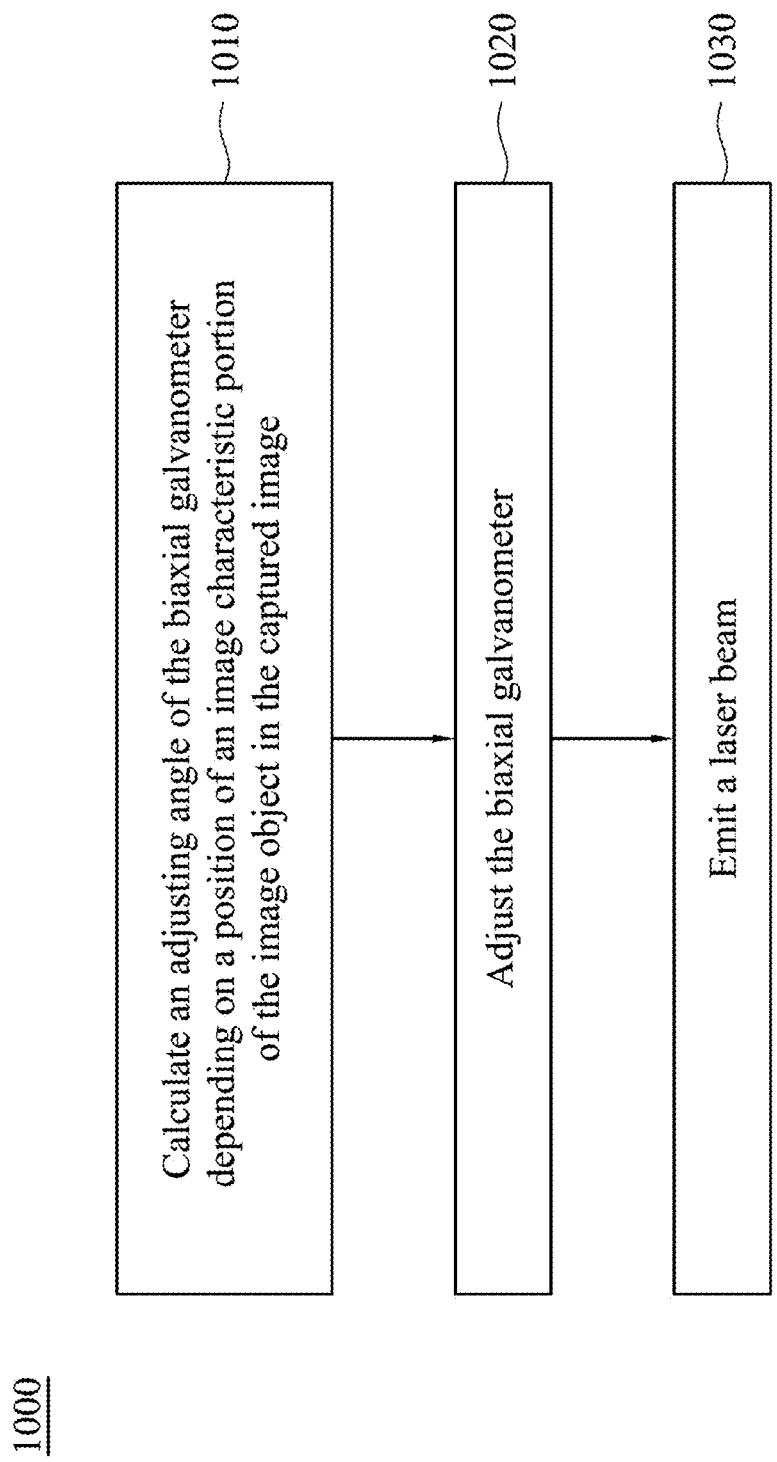
FIG. 10 is a flowchart of a laser beam emitting operation in accordance with some embodiments of the invention.

Subsequently, as shown in FIG. 10, a laser beam emitting operation 1000 is performed. The laser beam emitting operation 1000 is described in the following. First, Step 1010 is performed, in which an adjusting angle of the biaxial galvanometer 926 is calculated depending on a position of an image characteristic portion of the image object in the captured image. The adjusting angle of the biaxial galvanometer 926 may be separated into a horizontal component adjusting angle and a vertical component adjusting angle. The horizontal component adjusting angle may be obtained by the following method. First, the processing module 820 calculates the horizontal unit length $PX_{FH}$ of the pixels of the image sensor 912 corresponding to the front scene according to Formula (1):

$$PX_{FH} = \frac{2D\tan(FOV_H/2)}{X}, \quad (1)$$

where X is the pixel number of in the horizontal direction of the captured image, D is the distance between the lens 914 and the front scene, while $FOV_H$ is a field of view in the horizontal direction. Then, the processing module 820 calculates the horizontal component adjusting angle $\theta_H$ of the biaxial galvanometer 926 according to Formula (2):

$$\theta_H = \tan\left[\frac{(X/2) - P_H}{L_H} \times PX_{PH}\right], \quad (2)$$

where $L_H$ is the distance between the dichroic mirror 928 and the characteristic portion positioning point, and $P_H$ is the horizontal pixel position of the characteristic portion positioning point in the captured image. The vertical component adjusting angle of the biaxial galvanometer 926 can be obtained in a similar manner, and thus the description is not repeated herein.

After obtaining the adjusting angle of the biaxial galvanometer 926, the processing module 820 generates a voltage signal depending on the adjusting angle. The relationship of the voltage signal and the adjusting angle may be linear or non-linear depending on the type of the biaxial galvanometer 926. If the relationship of the voltage signal and the adjusting angle is linear, the value of the voltage signal may be obtained by dividing the adjusting angle by a maximum adjustable angle and then multiplying by a voltage value corresponding to the maximum adjustable angle. In addition, in some embodiments, the processing module 820 may obtain the value of the voltage signal from the look-up table that stores the corresponding relation between the voltage signal and the adjusting angle.

After Step 1010 is accomplished, Step 1020 is then performed, in which the processing module 820 transmits the voltage signal to the control module 830, such that the control module 830 adjusts the horizontal angle and the vertical angle of the biaxial galvanometer 926 based on the value of the voltage signal. After the biaxial galvanometer 926 is adjusted, Step 1030 is performed, in which the laser source 922 emits a laser beam. After the biaxial galvanometer 926 is adjusted, the laser beam emitted by the dichroic mirror 928 can be aimed at the characteristic portion of the object in the front scene.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A laser and imaging integration system, comprising:
   an object characteristic locating device, comprising:
   a camera module configured to capture an image from a front scene; and
   a processing module configured to perform the following operations:
   locating a position of an image object in the captured image, and determining a framing range with the image object from the captured image; and
   preforming image processing on the framing range according to a characteristic of the image object, so as to locate the position of an image characteristic portion of the image object in the captured image; and
   a laser module configured to emit a laser beam toward a characteristic portion of an object in the front scene corresponding to the image characteristic portion according to the position of the image characteristic portion in the captured image located by the object characteristic locating device, wherein the laser module comprises:
   a laser source configured to emit the laser beam;
   a dichroic mirror configured to reflect the laser beam and allow incident light corresponding to the captured image to pass therethrough; and
   a biaxial galvanometer disposed in an optical path of the laser beam, the biaxial galvanometer configured to adjust an angle thereof according to a voltage signal, so as to change a traveling direction of the laser beam.

2. The laser and imaging integration system of claim 1, further comprising:
   a control module coupled to the processing module and the laser module;
   wherein the processing module is configured to transmit the voltage signal to the control module, such that the control module controls the angle of the biaxial galvanometer accordingly.

3. The laser and imaging integration system of claim 1, wherein the processing module is further configured to perform the following operations:
   recognizing a type of the image object from the captured image; and
   determining an image processing mechanism on the framing range depending on the type of the image object.

4. The laser and imaging integration system of claim 3, wherein the processing module is configured to determine the framing range according to a training model, and is configured to determine the type of the image object from a correlation between the training model and the framing range.

5. The laser and imaging integration system of claim 1, wherein the operation of performing image processing on the framing range by the processing module comprises performing chromaticity space conversion on the framing range.

6. The laser and imaging integration system of claim 1, wherein the operation of performing image processing on the framing range by the processing module comprises:
   determining a corresponding area of the image characteristic portion in the framing range depending on a chromaticity space threshold; and
   calculating a center point of the corresponding area to be regarded as the position of an image characteristic portion in the captured image.

* * * * *